Dec. 6, 1966  R. G. BOARD ETAL  3,289,970
RETRACTABLE SAFETY BELTS

Filed June 23, 1964  2 Sheets-Sheet 2

INVENTORS
RICHARD G. BOARD
NELSON H. SHAPIRO

BY *Shapiro and Shapiro*

ATTORNEYS

United States Patent Office 3,289,970
Patented Dec. 6, 1966

3,289,970
RETRACTABLE SAFETY BELTS
Richard G. Board, Bethesda, Md. (3000 Connecticut Ave., Washington, D.C.), and Nelson H. Shapiro, Hyattsville, Md. (640 Washington Bldg., Washington, D.C.)
Filed June 23, 1964, Ser. No. 377,344
5 Claims. (Cl. 242—107.4)

This invention relates to retractable safety belts and more particularly to so-called seat belts for use in automotive vehicles or the like.

A retractable seat belt presently in use comprises a pair of straps which carry the mating parts of a belt fastener couple. The tongue of the fastener couple is attached to the end of a strap which is wound upon a retracting reel mounted upon the floor at one side of the vehicle seat. One end of the other strap is threaded through the buckle to provide some excess, so that the effective length of the strap may be adjusted, and the other end is anchored to the floor at the other side of the seat. The strap associated with the tongue is kept relatively short and must be fully extended from the retracting reel when the belt is fastened in order to prevent further extension of the strap from the reel in a collision. Heretofore, it has not been possible to provide a convenient foolproof means which would permit variable extension of the strap from the reel and yet automatic extension locking after withdrawal of the desired amount of strap. The strap associated with the buckle is not retractable and must be made long enough to permit substantial adjustment of the buckle position in order to accommodate the size and clothing of the user. This type of seat belt installation leaves much to be desired.

It is accordingly a principal object of the present invention to provide a retractable seat belt which avoids or substantially alleviates the disadvantages of the above-described prior retractable seat belt and which employs principles which are applicable to other types of seat belt installations, for example, those in which the vehicle seat can withstand collision forces, so that a single retractable strap may be anchored at each end to the seat, and those in which a retracting reel is employed at each side of the seat.

A more specific object of the invention is to provide a retractable seat belt or the like which may be readily extended to a selected length within a wide range of lengths to place the belt in user-restraining position but in which further extension is prevented automatically after the belt has been so extended.

A further object of the invention is to provide a retracting reel for a seat belt or the like which permits ready extension of the belt from the reel initially but which is locked, so as to prevent further extension, after the belt has been extended to any selected length within a wide range of lengths.

Another object of the invention is to provide a reel of the foregoing type which permits retraction of the belt even after the reel is locked against belt extension.

A still further object of the invention is to provide extension locking means for a retractable seat belt or the like, which is ineffective until the belt has been extended to a desired length within a wide range of lengths and which thereafter is automatically effective.

A further object of the invention is to provide improved extension locking means of the foregoing type which is responsive to the cessation of extensible movement of the belt.

Another object of the invention is to provide extension locking means of the foregoing type utilizing a uniquely controlled pawl and ratchet mechanism.

Still another object of the invention is to provide apparatus of the foregoing type in which a pawl is held disengaged from a ratchet until the belt has been extended to the desired length and is then engaged automatically.

Yet another object of the invention is to provide improved extension locks for seat belts or the like which operate according to a pull-stop cycle.

An additional object of the invention is to provide improved mechanisms for retractable seat belts and for other use.

Briefly stated, and without intent to limit the scope of the invention, one embodiment of a retractable seat belt installation in accordance with the invention employs a strap which is wound upon a retracting reel and which may be withdrawn from the reel to any selected length within a wide range of lengths, in order to accommodate the size and clothing of the user. Initially, the strap may be withdrawn freely from the reel, but when the strap has been withdrawn to the selected length, so that extensile movement of the strap has ceased, further extensile movement is prevented automatically. If the strap is then released, it retracts automatically and may then be extended again.

The foregoing and other objects, advantages, and features of the invention and the manner in which the same are accomplished will become more readily apparent upon consideration of the following detailed description of the invention taken in conjunction with the accompanying drawings, which illustrate preferred and exemplary embodiments, and wherein.

Figure 1:
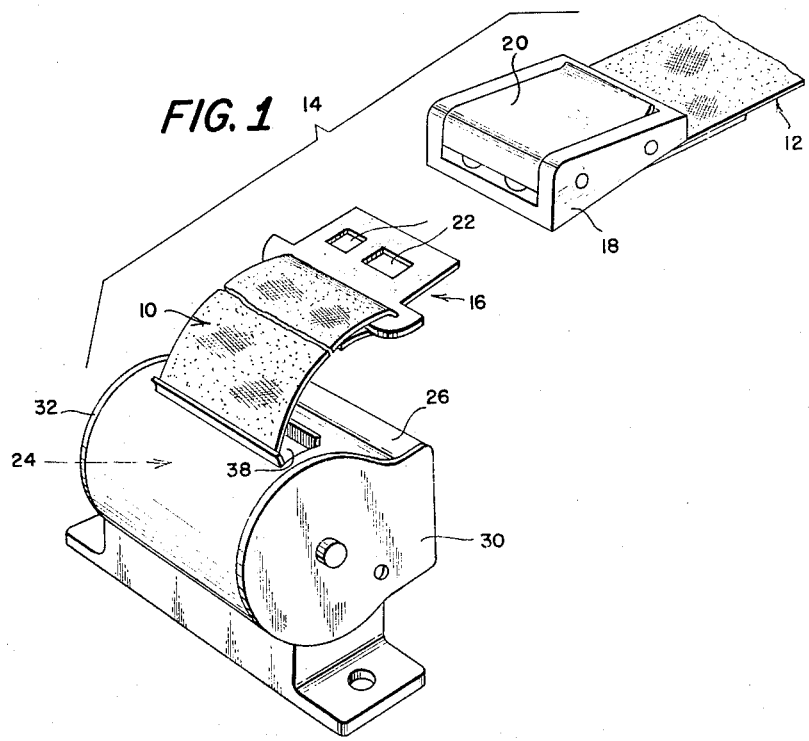
FIGURE 1 is a contracted perspective view illustrating a two-strap embodiment of the invention employing a retracting reel.

Referring to the drawings, and initially to FIGURE 1 thereof, a representative retractable seat belt embodiment of the invention comprises a pair of straps 10 and 12 having free ends attached to the mating parts of a fastener couple 14, which in the form shown comprises an apertured tongue 16 and a buckle 18, both of well known configuration. The buckle is arranged to receive the tongue and to retain the tongue therein until a release lever 20 (spring biased to a closed position) is lifted so as to permit the withdrawal of fastener abutments from the tongue apertures 22 in a well known manner. The distal end of strap 12 may be anchored to the vehicle floor behind the seat at one side of the occupant, so that the strap may be brought upwardly through the crotch of the seat or around the side of the seat to permit the buckle 18 to be grasped by the user. Strap 12 is of fixed length and may be relatively short so as to be unobtrusive.

Strap 10 has its distal end secured to a self-winding reel 24 rotatably supported in a housing or casing 26, which may be anchored to the vehicle floor at the side of the seat opposite to the anchorage of strap 12. The reel may be a conventional spring-wound type. In the embodiment shown the casing must be capable of sustaining collision forces. The reel may have a hollow arbor 28, which may contain a helical retracting spring 29 and which may be fixed to the associated end of strap 10. The arbor may be rotatably mounted upon the end walls 30 and 32 of the housing and may have a pair of end discs 34 rotatable therewith. Housing 26 has an opening 38 through which the strap 10 may be extended by grasping the tongue 16. Sufficient strap is wound upon the reel to permit full adjustment for the size and clothing of the user.

It is desired that the strap 10 be readily extensible from the reel to any length suitable for engagement of the tongue 16 with the buckle 18 and yet that the strap be locked against further extension after the strap has been extended to the desired length. For this purpose a reel lock is employed which is rendered ineffective until the strap has been extended to the desired length. In the form shown the reel lock comprises a pawl and ratchet mechanism, the ratchet 40 being secured to the arbor 28 of the reel. A pawl and ratchet may be provided at either or both ends of the reel, and if two such mechanisms are employed, the pawls may be connected if desired. For simplicity only one pawl and ratchet mechanism is shown. The ratchet wheel 40 may be constituted by or fixed to the corresponding end disc of the reel. The pawl 42 may be carried by a lever 44 pivotally mounted upon an end wall 30 of the reel housing, and the lever may be biased, as by means of a torsion spring 46, so as to engage the pawl with the ratchet. The pawl and the ratchet teeth 48 are shaped to prevent turning movement of the wheel in the direction for extension of strap 10 and yet to permit turning movement of the reel in the retracting direction, only a few of the teeth being shown.

Figure 4:
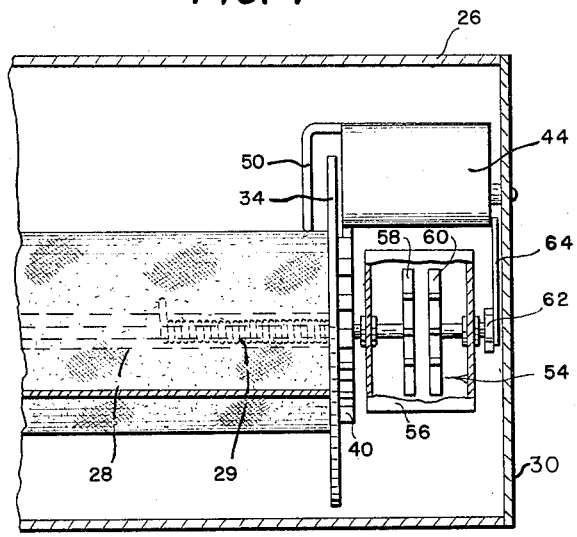
FIGURE 4 is a horizontal sectional view taken along line 4—4 of FIGURE 2.
Figure 5:
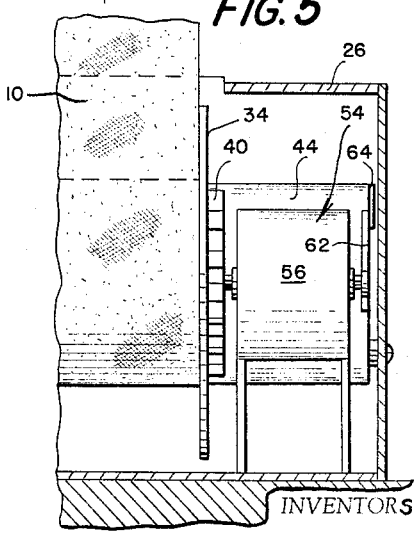
FIGURE 5 is a vertical sectional view taken along line 5—5 of FIGURE 3.

When lever 44 is turned (clockwise in FIGURE 2) so as to withdraw the pawl from the ratchet, tongue 16 may be grasped and strap 10 may be pulled so as to withdraw the strap from the reel to any desired length within the reel capacity. In the form shown the pawl is moved away from the ratchet by means of a feeler arm 50 extending from lever 44 into the reel toward the arbor, as shown in FIGURE 4, so as to engage the strap only when sufficient strap has been retracted upon the reel. Continued retraction moves the feeler arm 50 and the lever 44 so as to withdraw the pawl from the ratchet. The pawl is thus disengaged when the belt is not in use.

Figure 2:
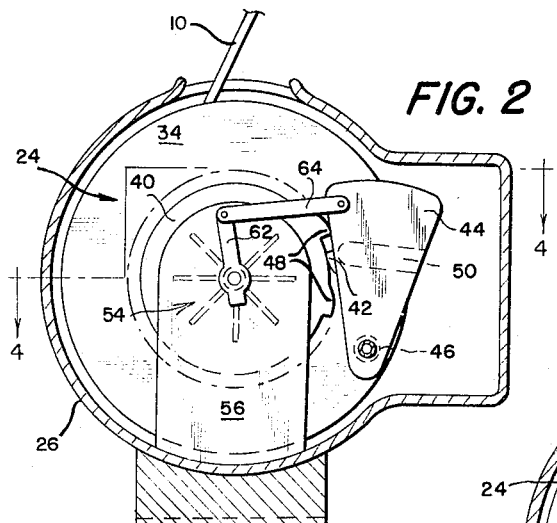
FIGURE 2 is a vertical sectional view of a retracting reel employing an extension lock in accordance with the invention.
Figure 3:
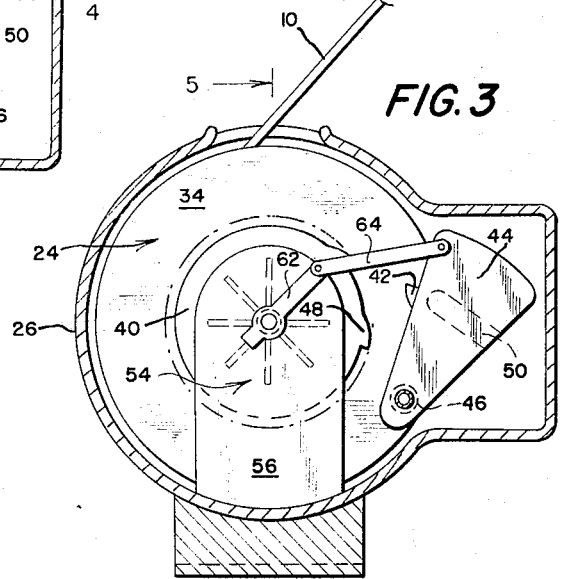
FIGURE 3 is a similar vertical sectional view illustrating another position of the lock.

In accordance with the invention, the extension lock is maintained ineffective so long as the reel turns in an extending direction, and the lock becomes effective upon cessation of the extensile movement. The pawl lever 44 is coupled to a motion-responsive clutch 54, which may for example be a fluid coupling having a casing 56 containing a fluid (e.g., oil) of suitable viscosity in which are immersed an impeller rotor 58 rotatable with the reel and a reactor rotor 60 which moves under the influence of the fluid. The reactor rotor is coupled by a linkage 62, 64 to the pawl lever 44. The pawl lever is moved clockwise, approximately to the position shown in FIGURE 3, by the engagement of feeler arm 50 with the strap upon the reel when the strap is retracted. If now the strap is extended, the clockwise rotation of the impeller rotor 58 exerts a force upon the reactor rotor 60 through the moving fluid which tends to maintain the linkage 62, 64 in the position of FIGURE 3 after the feeler arm 50 has lost contact with the strap. When the extensile movement of the strap has ceased, the pressure upon the reactor rotor 60 is released, and the pawl is permitted to move counterclockwise into engagement with the ratchet, as shown in FIGURE 2, under the bias of its return spring 46, which may be assisted by a return spring for the reactor rotor 60. The reactor rotor may have stops to limit its movement, and the clutch may be designed (as by blade contouring) to reduce drag during retraction. Other types of clutches may be employed, such as centrifugal clutches, or eddy current clutches, for example, and gearing may be interposed between the reel and the clutch.

While a preferred embodiment of the invention has been shown and described, it will be apparent to those skilled in the art that modifications can be made without departing from the principles and spirit of the invention, the scope of which is defined in the appended claims. For example, a belt clamp may be utilized instead of a reel lock, and other types of devices for rendering the extension lock initially ineffective may be utilized. For example, such devices may count or be responsive to the number of reel turns or may measure the length of strap as it passes to or from the reel or may be responsive to an abutment carried by the belt. Accordingly, the foregoing embodiments are to be considered illustrative, rather than restrictive of the invention, and those modifications which come within the meaning and range of equivalency of the claims are to be included therein.

The invention claimed is:

1. A retractable seat belt comprising a strap, means movable in a retracting direction for retracting said strap and movable in an extending direction for permitting extension of said strap, means for preventing extension of said strap when said strap has been extended to any selected length within a wide range of lengths, and automatic means for rendering said extension-preventing means ineffective during extensile movement of said strap to said selected length and thereafter, in response to cessation of said extensile movement of said strap, for rendering said preventing means effective.

2. A retractable seat belt comprising a strap, reel means for retracting said strap, said strap being arranged for extension from said reel means to any selected length within a wide range of lengths, means for preventing extension of said strap, and automatic means for rendering said preventing means ineffective during extensile movement of said strap to said selected length and thereafter, in response to cessation of said extensile movement of said strap, for rendering said preventing means effective.

3. The retractable seat belt of claim 2, said means for rendering said preventing means ineffective comprising means dependent upon the amount of retracted strap for placing said preventing means in an ineffective condition and means dependent upon continued extensile movement of said strap for maintaining said preventing means ineffective.

4. The retractable seat belt of claim 2, said means for preventing extension of said strap comprising a pair of cooperative locking elements one of which is movable with respect to the other between engaged and disengaged positions, said automatic means comprising movement-responsive means exerting a force on said one element away from engagement with the other element in response only to extensile movement of said strap, and means for moving said one element into engagement with the other element when said extensile movement ceases.

5. The retractable seat belt of claim 2, said means for preventing extension of said strap comprising a ratchet wheel fixed to said reel for rotation therewith and a cooperating pawl, said automatic means comprising movement-responsive means exerting a force on said pawl away from said ratchet wheel in response only to extensile movement of said strap, and means for moving said pawl into engagement with said ratchet wheel when said extensile movement ceases.

References Cited by the Examiner
UNITED STATES PATENTS 3,174,704   3/1965   Replogle _____ 242—107.4

FRANK B. SHERRY, *Primary Examiner.*

FRANCIS K. ZUGEL, *Examiner.*

C. A. NUNBERG, R. B. FARLEY, *Assistant Examiners.*